US009641210B2

(12) United States Patent
Wong

(10) Patent No.: US 9,641,210 B2
(45) Date of Patent: May 2, 2017

(54) PROTECTIVE CASE FOR ELECTRONIC DEVICE

(71) Applicant: Chin-Juh Wong, New Taipei (TW)

(72) Inventor: Chin-Juh Wong, New Taipei (TW)

( * ) Notice: Subject to any disclaimer, the term of this patent is extended or adjusted under 35 U.S.C. 154(b) by 0 days.

(21) Appl. No.: 14/930,660

(22) Filed: Nov. 3, 2015

(65) Prior Publication Data

US 2016/0149608 A1 May 26, 2016

(30) Foreign Application Priority Data

Nov. 24, 2014 (CN) ..................... 2014 2 0712734 U

(51) Int. Cl.
*H04B 1/3888* (2015.01)
(52) U.S. Cl.
CPC .................. *H04B 1/3888* (2013.01)
(58) Field of Classification Search
CPC ........................... H04B 1/3888; H04M 1/0214
USPC ............................................ 455/575.8, 575.1
See application file for complete search history.

(56) References Cited

U.S. PATENT DOCUMENTS

| | | | | | |
|---|---|---|---|---|---|
| 4,027,206 | A * | 5/1977 | Lee | ..................... | H05K 7/20909 165/80.3 |
| 4,322,737 | A * | 3/1982 | Sliwa, Jr. | .............. | F28D 15/046 165/104.26 |
| 5,835,344 | A * | 11/1998 | Alexander | ............ | G06F 1/1628 206/320 |
| 6,256,201 | B1 * | 7/2001 | Ikeda | .................. | F28D 15/0233 165/104.26 |
| 7,907,394 | B2 * | 3/2011 | Richardson | ........... | G06F 1/1613 312/223.1 |
| 8,325,483 | B2 * | 12/2012 | Kondoh | ................. | H04B 1/036 361/679.54 |
| 8,355,248 | B2 * | 1/2013 | Nishi | ...................... | G06F 1/203 165/185 |
| 8,438,631 | B1 * | 5/2013 | Taylor | ................. | G06F 21/6236 726/15 |
| 8,982,555 | B2 * | 3/2015 | Nishi | .................... | G06F 1/1616 165/185 |
| 9,244,505 | B2 * | 1/2016 | Yu | ............................ | G06F 1/203 |
| 9,268,377 | B2 * | 2/2016 | MacDonald | .......... | G06F 1/1681 |
| 2004/0244397 | A1 * | 12/2004 | Kim | ........................ | G06F 1/203 62/259.2 |
| 2008/0310108 | A1 * | 12/2008 | Eriksson | ............ | H05K 7/20418 361/697 |
| 2011/0120670 | A1 * | 5/2011 | Doss | ..................... | G06F 1/1628 165/80.1 |

(Continued)

*Primary Examiner* — Hai V Nguyen

(57) ABSTRACT

A protective case for an electronic device contains a first covering part and a second covering part which are connected together to define a hollow accommodation chamber for housing an electronic device. The second covering part couples with a back face of the electronic device and includes a heat removal groove for accommodating a heat dissipation plate, and when the electronic device is housed in the accommodation chamber, it contacts with the heat dissipation plate. The first covering part connects with a front face of the electronic device by using its internal face and includes a transparent visible window aligning with a touch screen of the front face of the electronic device. The accommodation chamber includes at least one receiving interface corresponding to at least one peripheral port of the electronic device and includes at least one button port for extending at least one button of the electronic device outwardly.

8 Claims, 6 Drawing Sheets

(56) References Cited

U.S. PATENT DOCUMENTS

| | | | |
|---|---|---|---|
| 2011/0188226 A1* | 8/2011 | Kim | H05K 9/00 |
| | | | 361/818 |
| 2012/0155020 A1* | 6/2012 | Nishi | G06F 1/203 |
| | | | 361/679.55 |
| 2014/0189811 A1* | 7/2014 | Taylor | G06F 21/6236 |
| | | | 726/4 |
| 2014/0347811 A1* | 11/2014 | Yu | G06F 1/203 |
| | | | 361/679.54 |
| 2015/0119111 A1* | 4/2015 | Honmura | G06F 1/203 |
| | | | 455/566 |
| 2015/0202836 A1* | 7/2015 | Lin | B32B 3/30 |
| | | | 428/650 |
| 2015/0212557 A1* | 7/2015 | Lin | G06F 1/203 |
| | | | 361/679.54 |
| 2015/0219406 A1* | 8/2015 | Lin | F28F 3/02 |
| | | | 165/133 |
| 2016/0073553 A1* | 3/2016 | Chiang | G06F 1/203 |
| | | | 361/679.54 |

* cited by examiner

US 9,641,210 B2

PROTECTIVE CASE FOR ELECTRONIC DEVICE

FIELD OF THE INVENTION

The present invention relates to a protective case which is employed to cover an electronic device.

BACKGROUND OF THE INVENTION

A conventional protective case is applied to cover an electronic device and contains an accommodation chamber defined on a bottom covering part and retained with the electronic device, so a touch screen of the electronic device exposes outside, thus the electronic device is broken easily.

Another conventional protective case contains a rotatable covering part covering a touch screen of the electronic case. However, the rotatable covering part has to be rotated away from the touch screen so as to view the touch screen, thus causing using inconvenience.

Furthermore, above-mentioned protective cases cannot dissipate heat of the electronic devices effectively.

The present invention has arisen to mitigate and/or obviate the afore-described disadvantages.

SUMMARY OF THE INVENTION

The primary objective of the present invention is to provide a protective case which has using convenience, using comfort, and scratch protection.

To obtain above objective, a protective case provided by the present invention contain: a first covering part and a second covering part.

The first covering part and the second covering part are connected together to define a hollow accommodation chamber between the first covering part and the second covering part so as to house an electronic device, and an inner face of the second covering part couples with a back face of the electronic device.

The second covering part further includes a heat removal groove defined on the inner face thereof and configured to accommodate a heat dissipation plate, and when the electronic device is housed in the accommodation chamber, it contacts with the heat dissipation plate.

An internal face of the first covering part connects with a front face of the electronic device, and the first covering part includes a visible window aligning with a touch screen of the front face of the electronic device, the visible window is transparent.

The accommodation chamber includes at least one receiving interface corresponding to at least one peripheral port of the electronic device, and the accommodation chamber also includes at least one button port for extending at least one button of the electronic device outwardly.

Preferably, the first covering part further includes a first adhesive layer configured around the internal face thereof so as to connect the first covering part with the front face of the electronic device.

Preferably, the second covering part further includes a second adhesive layer configured around the inner face thereof so as to connect the second covering part with the back face of the electronic device.

Preferably, each of the first covering part and the second covering part is a thin plate.

Preferably, the at least one receiving interface is configured on the first covering part or the second covering part.

Preferably, the at least one button port is configured on the first covering part or the second covering part.

Preferably, the first covering part further includes at least one first insertion hole defined on a peripheral side thereof, the second covering cover further includes at least one second insertion hole defined on a peripheral side thereof, and the at least one first insertion hole connects with the at least one second insertion hole to form the at least one receiving interface.

Preferably, the first covering part further includes at least one first accommodating hole arranged on the peripheral side thereof, the second covering cover further includes at least one second accommodating hole arranged on the peripheral side thereof, and the at least one first accommodating hole connects with the at least one second accommodating hole to form the at least one button port.

Preferably, the protective case further contains a metal piece configured to dissipate heat of the electronic device and disposed in the heat removal groove, wherein a peripheral side of the metal piece retains with the second covering part, and the heat dissipation plate contacts with the metal piece.

Preferably, the heat dissipation plate has a heat guiding layer, a heat carrying layer, and a heat removing layer, wherein the heat guiding layer is configured on a first side of the heat carrying layer, and the heat removing layer is arranged on a second side of the heat carrying layer, the heat removing layer contacts with the metal piece, and the heat guiding layer contacts with the electronic device so that the heat of the electronic device conducts to the metal piece from the heat carrying layer via the heat removing layer, thus dissipating the heat to air.

DETAILED DESCRIPTION OF THE PREFERRED EMBODIMENTS

Figure 1:
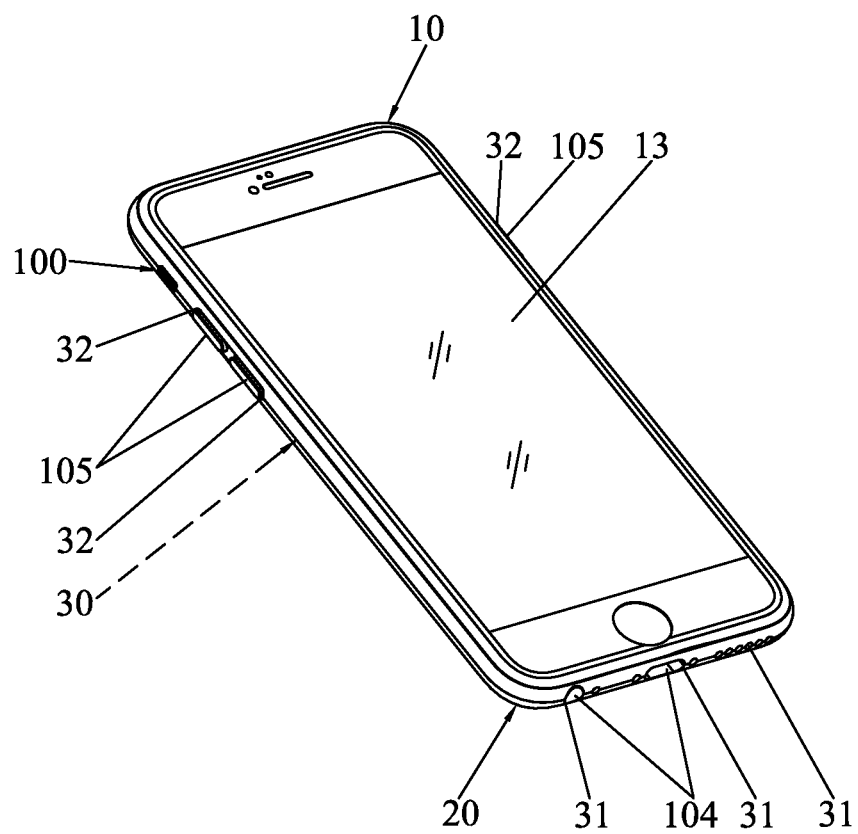
FIG. 1 is a perspective view showing the assembly of a protective case according to a preferred embodiment of the present invention.
Figure 2:
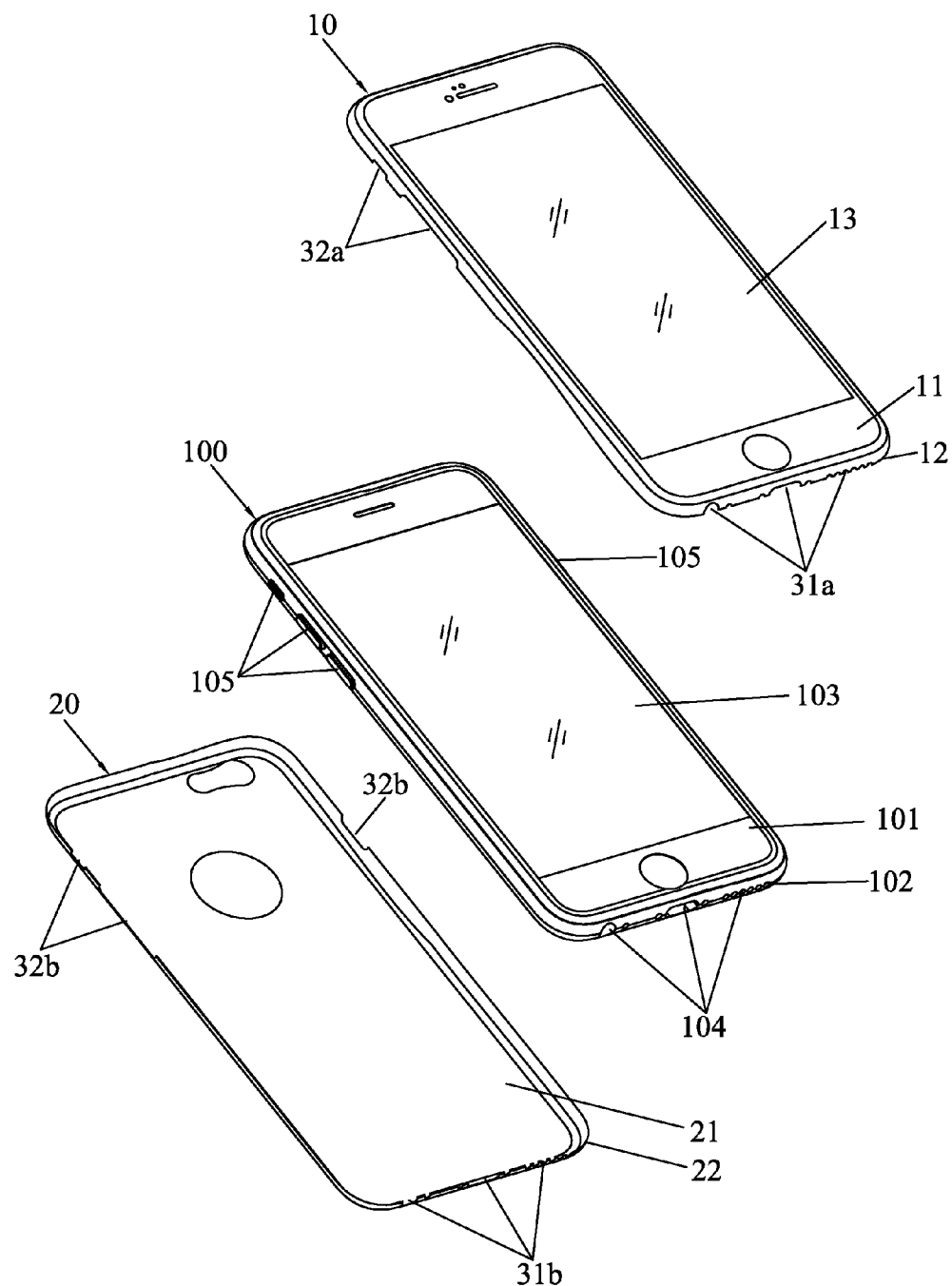
FIG. 2 is a perspective view showing the exploded components of the protective case according to the preferred embodiment of the present invention.

With reference to FIGS. 1 and 2, a protective case according to a preferred embodiment of the present invention is employed to cover an electronic device 100 and comprises a first covering part 10 and a second covering part 20; wherein the first covering part 10 and the second covering part 20 are connected together to define a hollow accommodation chamber 30 between the first covering part 10 and the second covering part 20 so as to house the electronic device 100, and an inner face 21 of the second covering part 20 couples with a back face 102 of the electronic device 100 in any one of a locking manner, an adhering manner, and a riveting manner, wherein an outer face 22 of the second covering part 20 exposes outside. An internal face 12 of the first covering part 10 connects with a front face 101 of the electronic device 100 in any one of a locking manner, an adhering manner, and a riveting manner. An external face 11 of the first covering part 10 exposes outside, and the first covering part 10 includes a visible window 13 aligning with a touch screen 103 of the front face 101 of the electronic device 100, wherein the visible window 13 is transparent and is made of any one of glass, polypropylene (PP), polyvinyl chloride (PVC), polyethylene terephthalate (PET), and ARM material. One surface of the visible window 13 facing to a user has any one of a scratch-protective layer, a frosting layer, and a combination of the scratch-protective layer and the frosting layer. The accommodation chamber 30 includes at least one receiving interface 31 corresponding to at least one peripheral port 104 of the electronic device 100, at least one button port 32 for extending at least one button 105 of the electronic device 100 outwardly. The first covering part 10 and the second covering part 20 enclosure the electronic device 100 in the accommodation chamber 30, and the at least one button 105 (such as at least one volume control button, an on/off button, etc.) and the at least one peripheral port 104 (such as charging interface, earphone interface, etc.) expose outside the protective case.

Referring to FIGS. 3 to 6, the first covering part 10 further includes a first adhesive layer 14 configured around the internal face 12 thereof so as to connect the first covering part 10 with the front face 101 of the electronic device 100. The first adhesive layer 14 is an adhesive strap configured around the internal face 12 of the first covering part 10.

Figure 4:
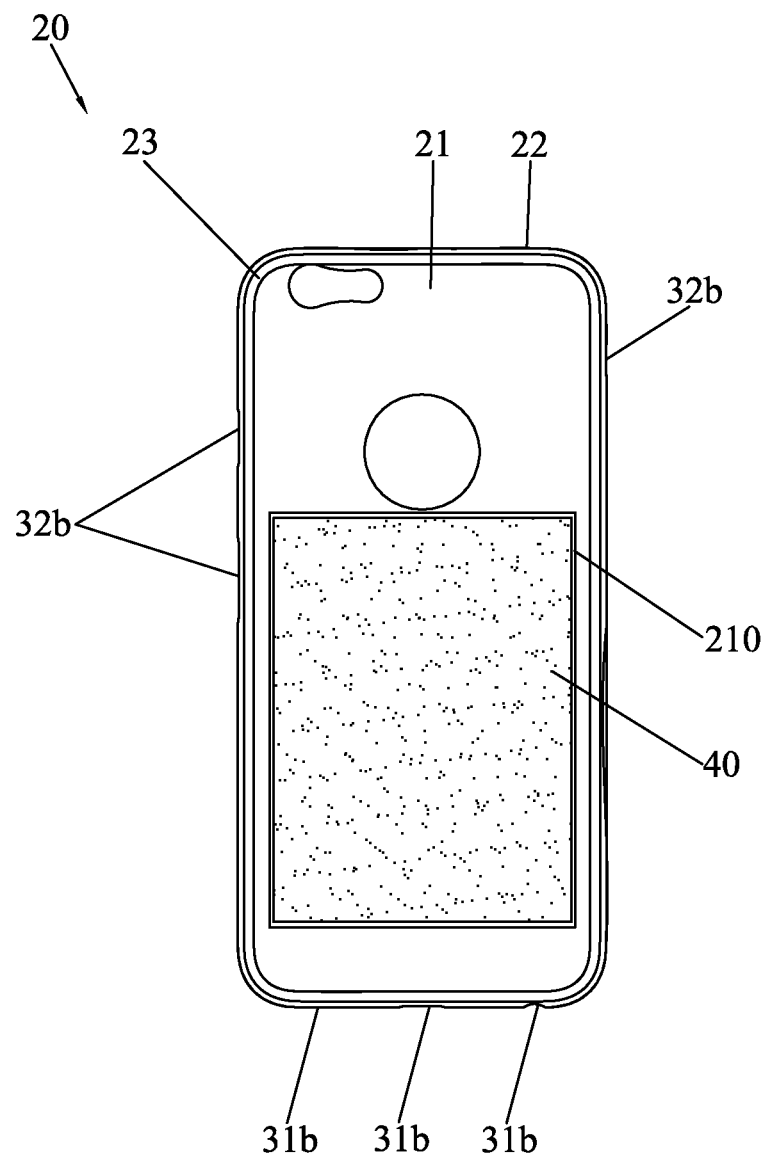
FIG. 4 is another plane side view showing the assembly of a part of the protective case according to the preferred embodiment of the present invention.

As shown in FIG. 4, the second covering part 20 further includes a second adhesive layer 23 configured around the inner face 21 thereof so as to connect the second covering part 20 with the back face 102 of the electronic device 100. The second adhesive layer 23 is an adhesive strap configured around the inner face 21 of the second covering part 20.

Preferably, each of the first covering part 10 and the second covering part 20 is a thin plate to prevent scratch of the electronic device 100, and the second covering part 20 is made of genuine leather or artificial leather, wherein the artificial leather is polyvinyl chloride (PVC) material or polyurethane (PU) material. In addition, the outer face 22 of the second covering part 20 has a pattern layer configured thereon for decoration.

Preferably, the at least one receiving interface 31 is configured on the first covering part 10 or the second covering part 20. In one embodiment, a sole receiving interface 31 is configured on the first covering part 10 or the second covering part 20, i.e., a charging interface is configured on the first covering part 10 or the second covering part 20, or the charging interface is configured on the first covering part 10, and the earphone interface is configured on the second covering part 20.

Preferably, the at least one button port 32 is configured on the first covering part 10 or the second covering part 20. In one embodiment, a sole button port 32 is configured on the first covering part 10 or the second covering part 20. In another embodiment, a first button port is configured on the first covering part 10 to extending out of a first volume control button, a second button port is configured on the first covering port 10 to extend out of the on/off button, and a third button port is configured on the second covering part 20 to extend out of a second volume control button.

Figure 3:
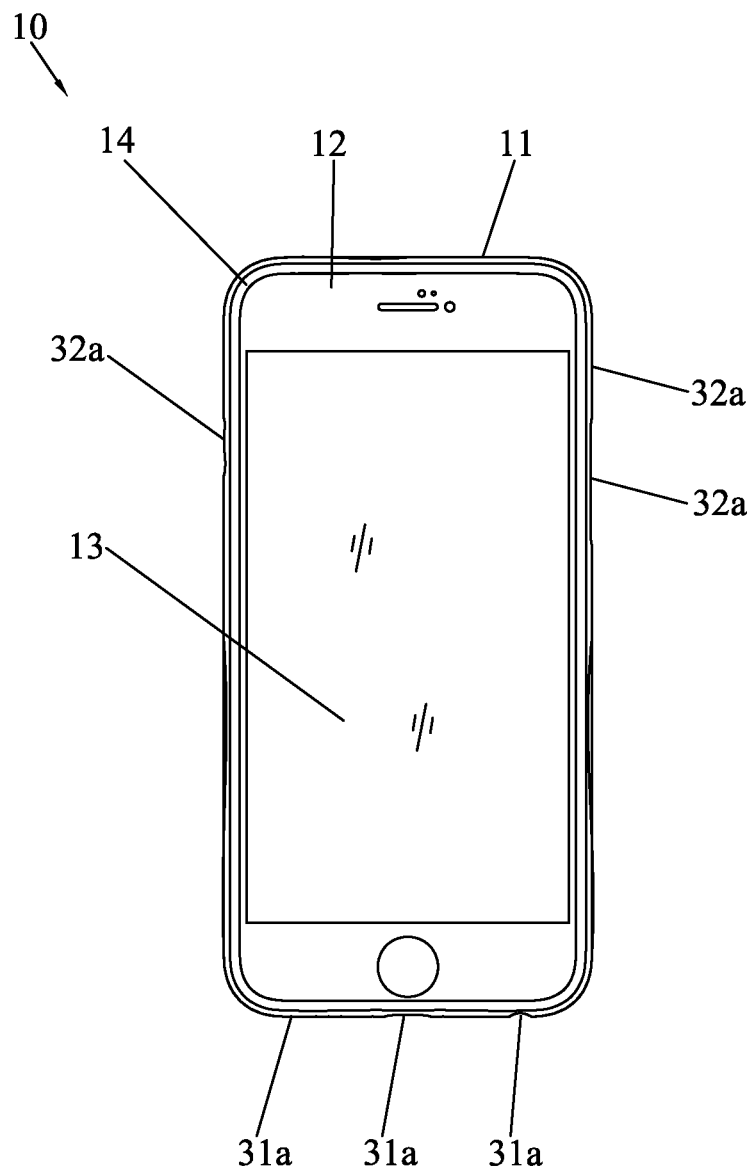
FIG. 3 is a plane side view showing the assembly of a part of the protective case according to the preferred embodiment of the present invention.

As illustrated in FIGS. 1 to 3, the first covering part 10 further includes at least one first insertion hole 31a defined on a peripheral side thereof, the second covering cover 20 further includes at least one second insertion hole 31b defined on a peripheral side thereof, and the at least one first insertion hole 31a connects with the at least one second insertion hole 31b to form the at least one receiving interface 31.

Preferably, the first covering part 10 further includes at least one first accommodating hole 32a arranged on the peripheral side thereof, the second covering cover 20 further includes at least one second accommodating hole 32b arranged on the peripheral side thereof, and the at least one first accommodating hole 32a connects with the at least one second accommodating hole 32b to form the at least one button port 32.

With reference to FIG. 4, the protective case further comprises a heat dissipation plate 40, and the second covering part 20 further includes a heat removal groove 210 defined on the inner face 21 thereof and configured to accommodate the heat dissipation plate 40, such that when the electronic device 100 is housed in the accommodation chamber 30, it contacts with the heat dissipation plate 40 to dissipate heat of the electronic device 100 effectively.

Figure 5:
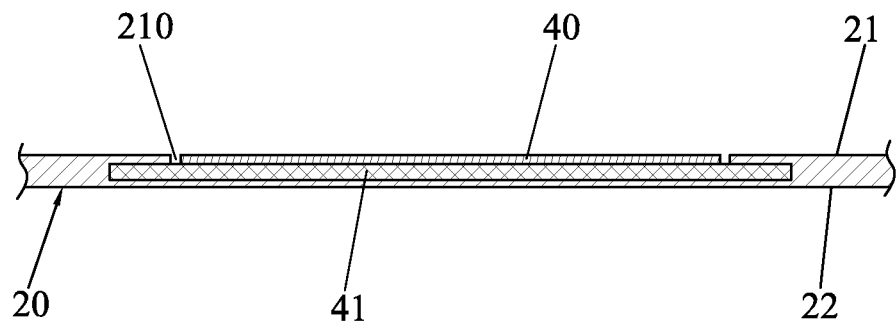
FIG. 5 is a cross sectional view showing the assembly of a part of the protective case according to the preferred embodiment of the present invention.

Referring to FIG. 5, the protective case further comprises a metal piece 41 configured to dissipate the heat of the electronic device 100 and disposed in the heat removal groove 210, wherein a peripheral side of the metal piece 41 retains with the second covering part 20, and the heat dissipation plate 40 contacts with the metal piece 41 to remove the heat of the electronic device 100 quickly. Preferably, when the second covering part 20 is made of the genuine leather or the artificial leather, the heat dissipation plate and the metal piece 41 are retained in the second covering part 20.

Figure 6:
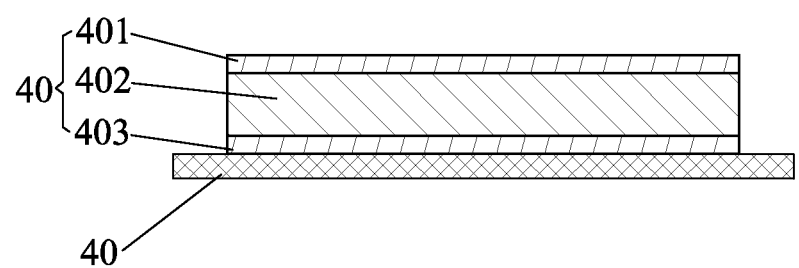
FIG. 6 is another cross sectional view showing the assembly of a part of the protective case according to the preferred embodiment of the present invention.

As shown in FIG. 6, the heat dissipation plate 40 has a heat guiding layer 401, a heat carrying layer 402, and a heat removing layer 403, wherein the heat guiding layer 401 is configured on a first side of the heat carrying layer 402, and the heat removing layer 403 is arranged on a second side of the heat carrying layer 402, the heat removing layer 403 contacts with the metal piece 41, and the heat guiding layer 401 contacts with the electronic device 100 so that the heat of the electronic device 100 conducts to the metal piece 41 from the heat carrying layer 402 via the heat removing layer 403, thus dissipating the heat to air.

Preferably, the touch screen 103 of the electronic device 100 is visible clearly through the visible window 13 so as to operate the electronic device 100 easily.

Figure 7:
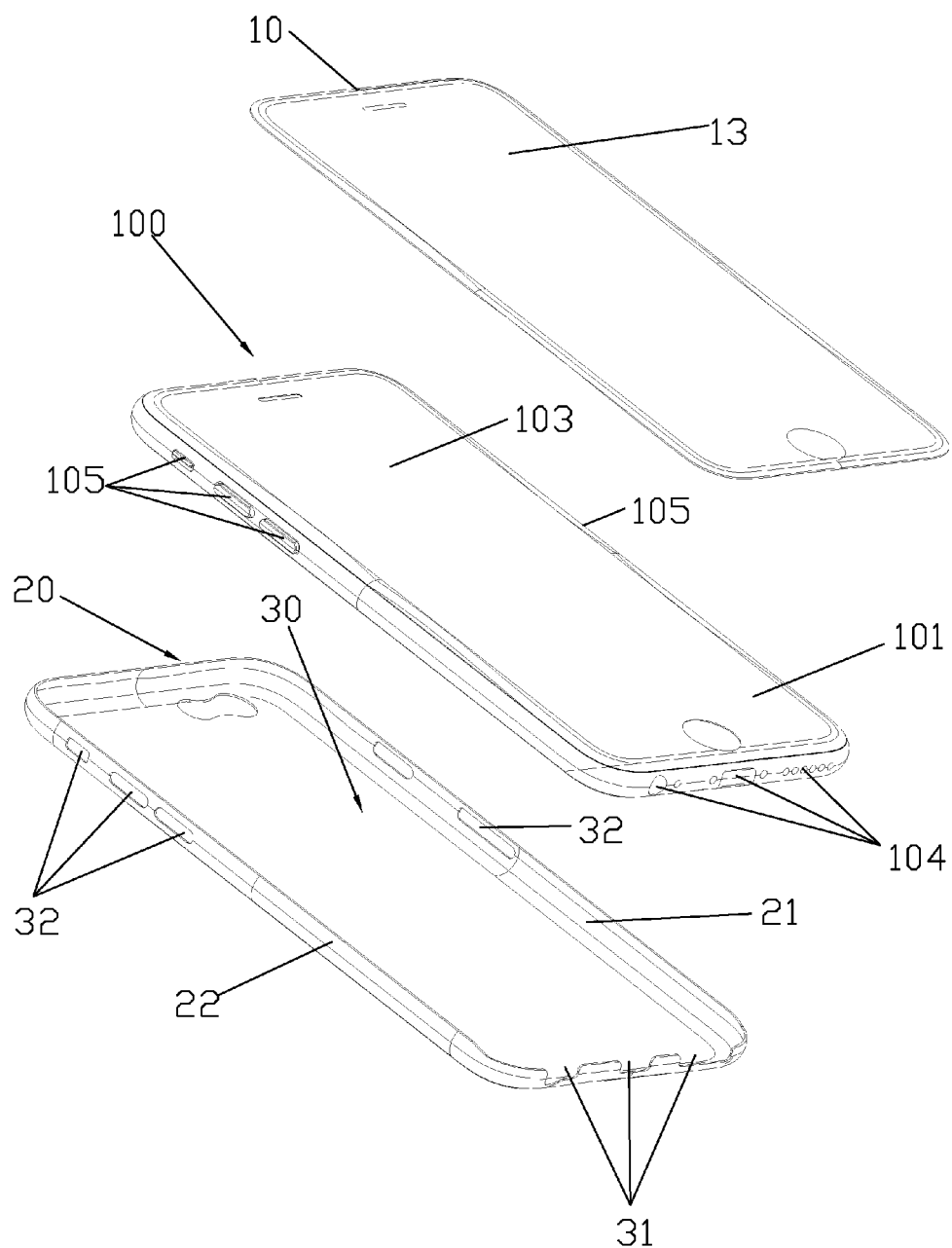
FIG. 7 is another perspective view showing the exploded components of a protective case according to another preferred embodiment of the present invention.

As illustrated in FIG. 7, in another embodiment, a protective case is employed to cover an electronic device 100 and comprises a first covering part 10 and a second covering part 20; wherein the first covering part 10 and the second covering part 20 are connected together to define a hollow accommodation chamber 30 between the first covering part 10 and the second covering part 20 so as to house the electronic device 10, and an inner face 21 of the second covering part 20 has a predetermined height, the first covering part 10 is flat, and the first covering part 10 includes a visible window 13 aligning with a touch screen 103 of a front face 101 of the electronic device 100, the inner face 21 of the second covering part 20 retains with a back face 102 of the electronic device 100. The second covering part 20 includes at least one receiving interface 31 corresponding to at least one peripheral port 104 of the electronic device 100, and the second covering part 20 also includes at least one button port 32 for extending at least one button 105 of the electronic device 100 outwardly.

The electronic device is any one of a tablet PC, a cell phone, and a palmtop computer.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A protective case being employed to cover an electronic device and comprising:
    a first covering part and a second covering part, the first covering part and the second covering part being connected together to define a hollow accommodation chamber between the first covering part and the second covering part so as to house an electronic device, and an inner face of the second covering part coupling with a back face of the electronic device;
    a metal piece configured to dissipate heat of the electronic device and disposed in the heat removal groove, wherein a peripheral side of the metal piece retains with the second covering part, and the heat dissipation plate contacts with the metal piece;
    wherein the second covering part further includes a heat removal groove defined on the inner face thereof and configured to accommodate a heat dissipation plate, and when the electronic device is housed in the accommodation chamber, it contacts with the heat dissipation plate;
    wherein an internal face of the first covering part connects with a front face of the electronic device, and the first covering part includes a visible window aligning with a touch screen of the front face of the electronic device, the visible window is transparent;
    wherein the hollow accommodation chamber includes at least one receiving interface corresponding to at least one peripheral port of the electronic device, and the hollow accommodation chamber also includes at least one button port for extending at least one button of the electronic device outwardly; and
    wherein the heat dissipation plate has a heat guiding layer, a heat carrying layer, and a heat removing layer, wherein the heat guiding layer is configured on a first side of the heat carrying layer, and the heat removing layer is arranged on a second side of the heat carrying layer, the heat removing layer contacts with the metal piece, and the heat guiding layer contacts with the electronic device so that the heat of the electronic device conducts to the metal piece from the heat carrying layer via the heat removing layer, thus dissipating the heat to air.

2. The protective case as claimed in claim 1, wherein the first covering part further includes a first adhesive layer configured around the internal face thereof so as to connect the first covering part with the front face of the electronic device.

3. The protective case as claimed in claim 1, wherein the second covering part further includes a second adhesive layer configured around the inner face thereof so as to connect the second covering part with the back face of the electronic device.

4. The protective case as claimed in claim 1, wherein each of the first covering part and the second covering part is a thin plate.

5. The protective case as claimed in claim 1, wherein the at least one receiving interface is configured on the first covering part or the second covering part.

6. The protective case as claimed in claim 1, wherein the at least one button port is configured on the first covering part or the second covering part.

7. The protective case as claimed in claim 1, wherein the first covering part further includes at least one first insertion hole defined on a peripheral side thereof, the second covering cover further includes at least one second insertion hole defined on a peripheral side thereof, and the at least one first insertion hole connects with the at least one second insertion hole to form the at least one receiving interface.

8. The protective case as claimed in claim 1, wherein the first covering part further includes at least one first accommodating hole arranged on the peripheral side thereof, the second covering cover further includes at least one second accommodating hole arranged on the peripheral side thereof, and the at least one first accommodating hole connects with the at least one second accommodating hole to form the at least one button port.

* * * * *